Feb. 20, 1951 M. R. PURVIS 2,542,208

TELEGRAPH CONCENTRATION BOARD CIRCUITS

Filed April 29, 1949

5 Sheets-Sheet 1

INVENTOR
M. R. PURVIS
BY John E. Cassidy
ATTORNEY

TELEGRAPH CONCENTRATION BOARD CIRCUITS

Filed April 29, 1949

5 Sheets-Sheet 2

TEST SIGNAL CORD CIRCUIT

TEST SIGNAL SUPPLY CIRCUIT

INVENTOR
M. R. PURVIS
BY John E. Cassidy
ATTORNEY

Feb. 20, 1951 M. R. PURVIS 2,542,208

TELEGRAPH CONCENTRATION BOARD CIRCUITS

Filed April 29, 1949

5 Sheets-Sheet 3

INVENTOR
M. R. PURVIS
BY John E. Cassidy
ATTORNEY

TELEGRAPH CONCENTRATION BOARD CIRCUITS

Filed April 29, 1949

5 Sheets-Sheet 4

INVENTOR
M. R. PURVIS
BY John E. Cassidy
ATTORNEY

LOOP MONITORING CIRCUIT

LOOP AND EQUIPMENT JACK CIRCUIT

INVENTOR
M. R. PURVIS
BY John E. Cassidy
ATTORNEY

Patented Feb. 20, 1951

2,542,208

UNITED STATES PATENT OFFICE 2,542,208

TELEGRAPH CONCENTRATION BOARD CIRCUITS

Matthew R. Purvis, Fanwood, N. J., assignor to Bell Telephone Laboratories, Incorporated, New York, N. Y., a corporation of New York Application April 29, 1949, Serial No. 90,513

8 Claims. (Cl. 178—73)

This invention relates to telegraph systems and more particularly to telegraph systems wherein private line facilities are associated together in local, statewide, or nationwide networks on a semi-permanent basis as distinguished from a telegraph exchange switching system.

An object of this invention is the improvement of arrangements for associating telegraph circuit elements such as lines and station loops in telegraph networks on a semi-permanent basis in order to facilitate additions to and subtractions from the network and to facilitate the substitution of new circuit elements for existing circuit elements as well as the testing of the various circuit elements in telegraph networks.

Another object of this invention is the provision of means for monitoring on subscriber loops and for testing loop repeaters in the service board office by sending test signals in both directions through these repeaters.

The operation of telegraph systems wherein private telegraph lines are associated together in networks which remain interconnected for indefinite periods has been characterized by a lack of flexibility prior to the development of the inverse neutral form of hub transmission, that is to say, the addition to the network or the subtraction from the network of telegraph lines or station loops, or the substitution in the network of one telegraph line or station loop for another previously required compensatory adjustments of one or more of the telegraph repeaters in the network because the repeaters were arranged in series and the current in the various repeaters was affected when the resistance was changed as the network was altered. Furthermore, added repeaters had to be adjusted to provide the proper polarity as well as type of operation, such as half or full duplex operation.

To overcome this difficulty, a system of inverse neutral hub transmission was devised and the operation of this system is described in Patents 2,056,277, F. S. Kinkead et al., October 3, 1936, 2,069,224, G. C. Cummings, February 2, 1932 and 2,069,251, F. S. Kinkead, February 2, 1937.

This invention differs from the one described in the above patents in that it makes use of a system of electronic hub transmission which employs an electronic control circuit as a means for interconnecting the legs of each line or loop repeater to the telegraph network. This form of transmission is described in the patent application of J. R. Davey, Serial No. 48,491, filed September 9, 1948, now Patent No. 2,528,120 dated October 31, 1950.

In the arrangement of the present system, the send and receive leg of each line or loop repeater is extended to a concentration jack circuit which includes two jacks, appearing in the telegraph service board, and a relay. The upper jack which is designated Legs permits the line or loop facility to be split off from its telegraph network or concentration group and patched elsewhere as a substitute or for testing purposes. The lower jack designated Test provides for connection of a test cord circuit such as a telegraph or teletypewriter cord circuit for monitoring by or communication with the service board operator. This jack also permits a spare line or loop facility to be substituted for the assigned one in which case the substitute facility uses the control circuit which was associated with the assigned facility. The test jack also provides access to the facility for the observance of hits and other disturbances.

From the concentraton jack circuit the send and receive legs of the repeater extend to the leg side of a control circuit. The opposite side of the control circuit connects to the hub circuit in which there are two hubs. Each concentration group includes a receiving hub and a sending hub. Each control circuit connects to the receiving hub circuit via a receiving hub lead designated RH. Likewise each control circuit connects to the send hub circuit via a sending hub lead designated SH. If there is no regenerator in the concentration group the receiving hub is connected directly to the sending hub by means of a "hub link" so that in effect the two hubs become a single hub. If a regenerator is provided the receiving and sending hubs are interconnected by means of a one-way regenerative repeater which receives signals from the receiving hub, regenerates them and transmits them to the sending hub. Signals transmitted by the receiving relay in a line or loop repeater enter the control circuit via the RL lead and in this case transmission is on a low impedance basis and of the type normally employed in conventional telegraph circuits. Signals received from the line or loop repeater are converted in the control circuit to a comparatively high impedance form of transmission and repeated to the receiving hub via the RH lead. Such signals pass either directly from the receiving to the sending hub via a hub link circuit or through a regenerative repeater. From the sending hub the signals pass over the SH leads to the hub sides of all control circuits to which the sending hub is connected. Each control circuit, with the exception of that which is transmitting to the receiving hub, converts the signals received from the sending hub from the high impedance form of transmission to the low impedance form and repeats them via the SL lead to the send relay in the associated line or loop facility.

Each loop facility which is to be connected into a concentration group is terminated in a loop repeater in the telegraph office where the telegraph service board is located. The leg sides of line and loop facilities are identical and every facility requires the use of a control circuit. The sending and receiving hub leads of each concentration group terminate on the tip and ring conductors respectively of a two-jack circuit which has been designated "hub jack circuit." The lower jack of this circuit is called the Hub jack and this provides for the connection of telegraph or teletypewriter cord circuits for monitoring and communication purposes. The lower or Hub jack also permits the addition of line or loop facilities to the concentration group. The upper or hub regenerative repeater Hub RGN jack provides for the substitution of a regenerative repeater when one is assigned to the group or for the addition of a regenerative repeater when regeneration is not normally provided.

One of the principal functions of the control circuit is to prevent signals transmitted into the receiving hub by a repeater from being transmitted from the sending hub back to the send leg of the same repeater. Thus, whenever a spacing pulse is transmitted through a control circuit to a receiving hub the control circuit functions to prevent this spacing pulse from being transmitted from the sending hub back to the repeater from which it was received. In this case the control circuit sends a mark to its associated repeater from which it is receiving a space. There is one exception to this rule and that occurs when two or more repeaters in the same concentration group transmit spaces toward the receiving hub simultaneously. Spacing signals are transmitted to all repeaters associated with the concentration group during the simultaneous occurrence of two or more spaces. This condition is explained in conjunction with the so-called "double-space by-pass feature."

The purpose of the double-space by-pass feature is to cause the prompt garbling or mutilation of the local copy of any sending teletypewriter station in the event that another station in the same concentration group begins to send simultaneously.

The invention may be more fully understood from the following description when read with reference to the associated drawings in which.

Figure 2:
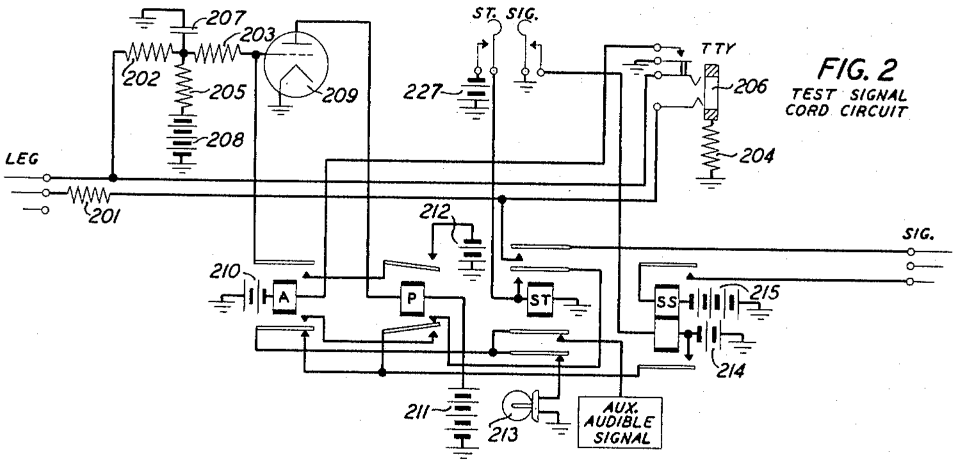
Figure 3:
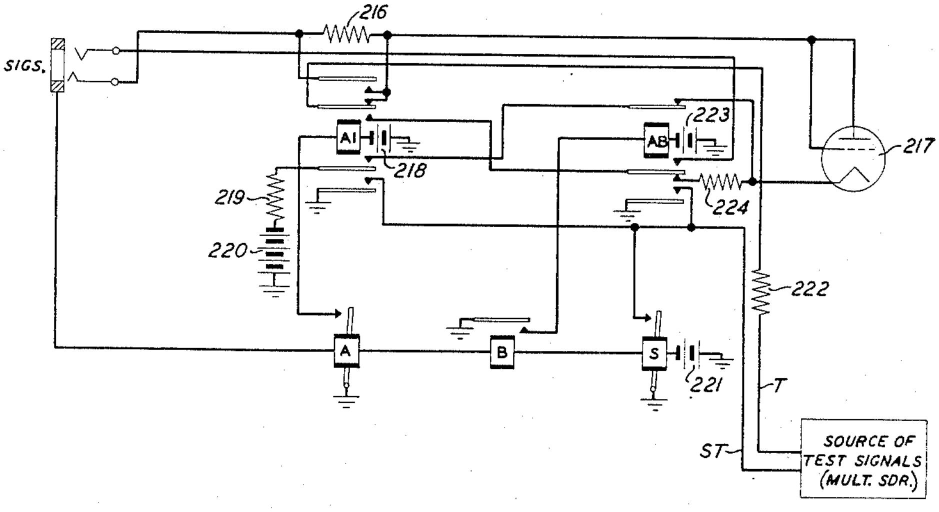
Figure 4:
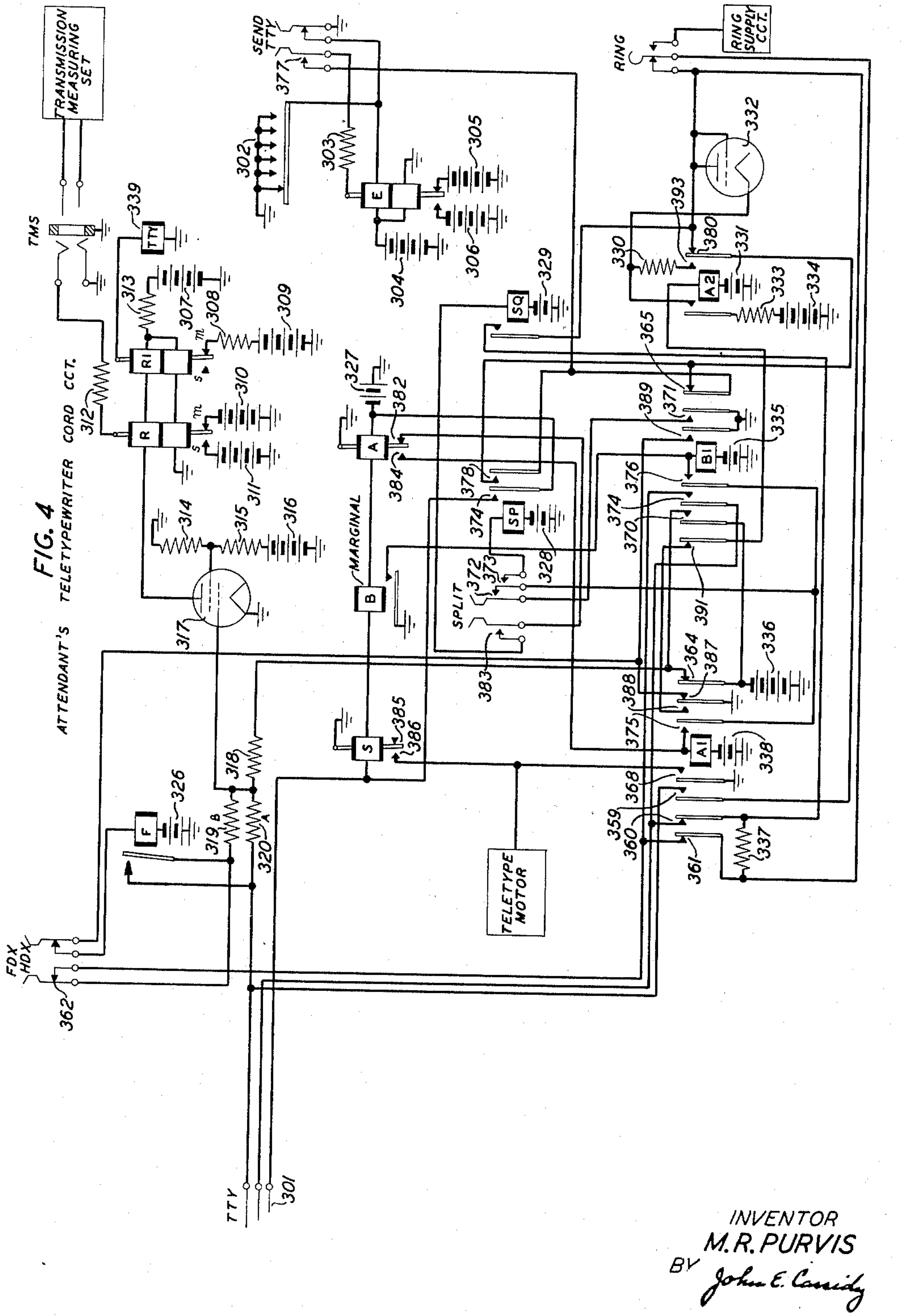
Figures 5, 5A:
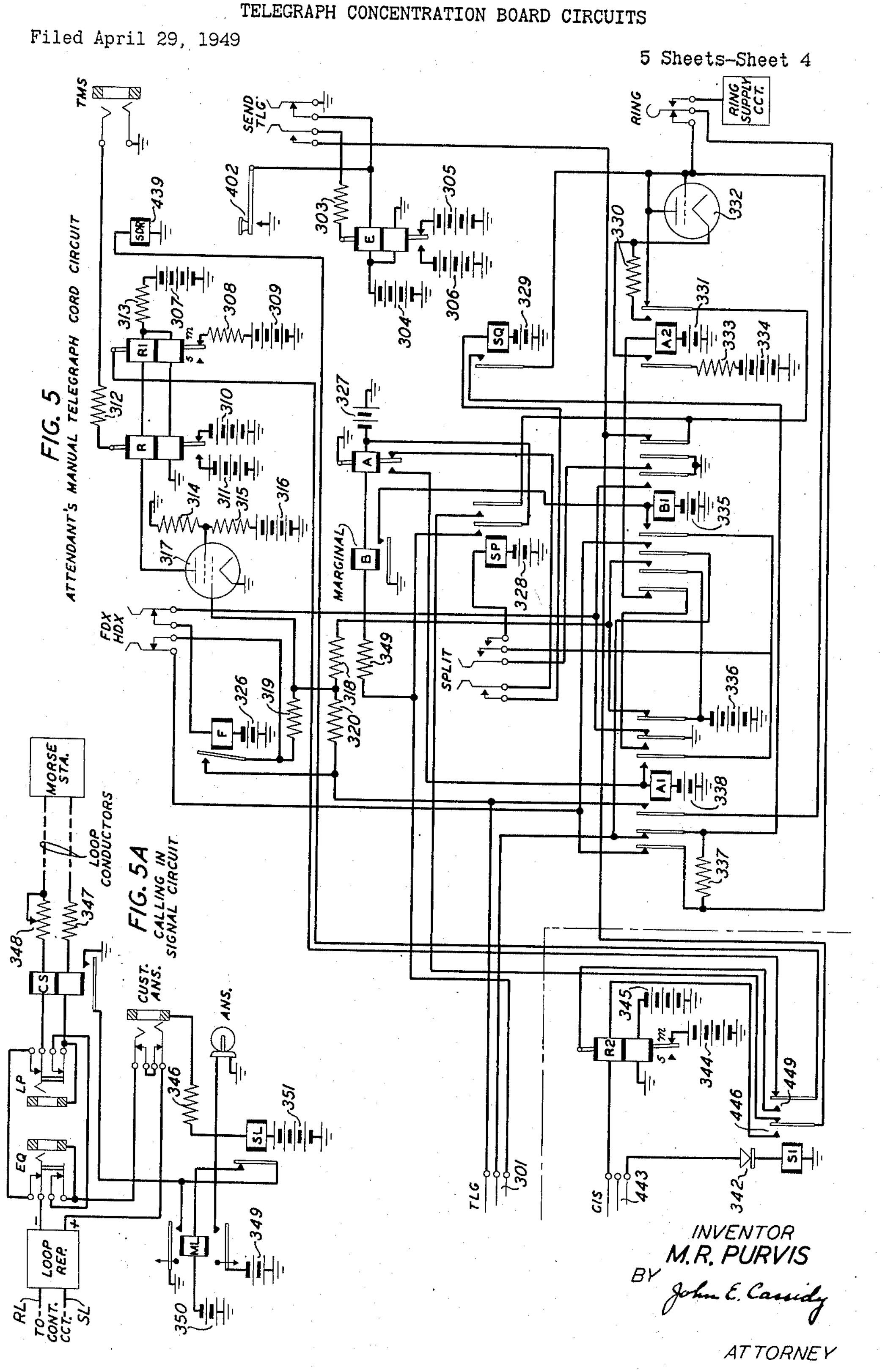
Figures 6, 6B:
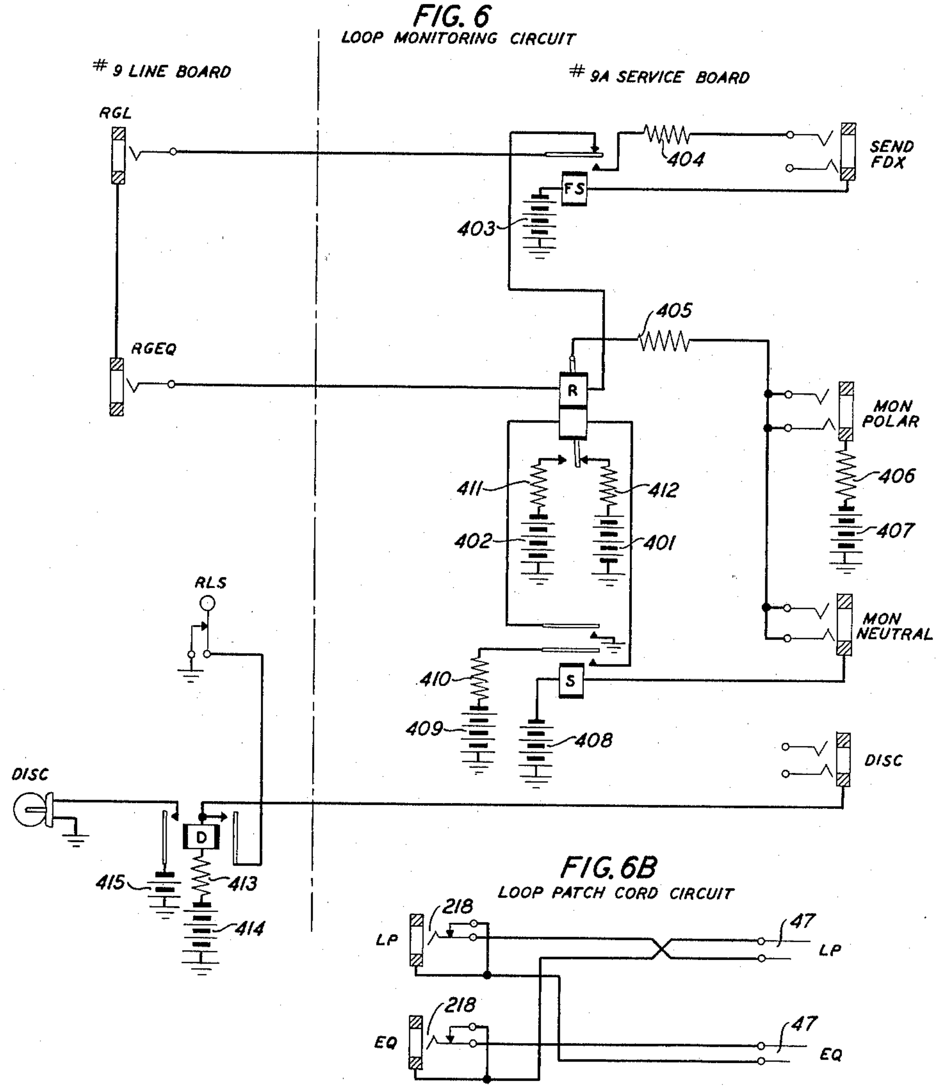
Figure 6A:
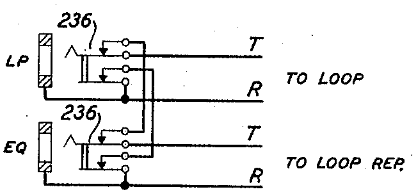

Fig. 2 represents a test signal cord circuit which is used for connecting a source of teletypewriter test signals to the Legs jack of a line or loop facility. This cord includes a feature which permits the attendant at the distant office or station to stop the transmission of test signals by sending a two second break signal. A teletypewriter jack provides for the connection of the attendant's teletypewriter cord circuit for communication with the distant attendant or for observing transmission of outgoing signals;

Fig. 3 represents a test signal supply circuit with associated multiple sender or other source of test signals;

Fig. 4 represents an attendant's teletypewriter cord circuit for monitoring or communication in any Legs, Test or Hub jack. Jack TMS is provided for connecting a transmission measuring set to the teletypewriter cord circuit;

Fig. 5 represents an attendant's manual telegraph cord circuit for monitoring or communication in any Legs, Test or Hub jack. This circuit is also equipped with a TMS jack for the connection of a transmission measuring set;

Fig. 5A shows a calling in signal circuit;

Fig. 6 represents a loop monitoring circuit which provides means for monitoring on the loop side of a loop repeater and for sending test signals toward the hub from the loop side of the loop repeater;

Fig. 6A shows a loop and equipment jack circuit; and

Fig. 6B shows a loop patching cord circuit.

*Concentration group*

Figures 1, 1A, 1B, 1C, 1D, 1E:
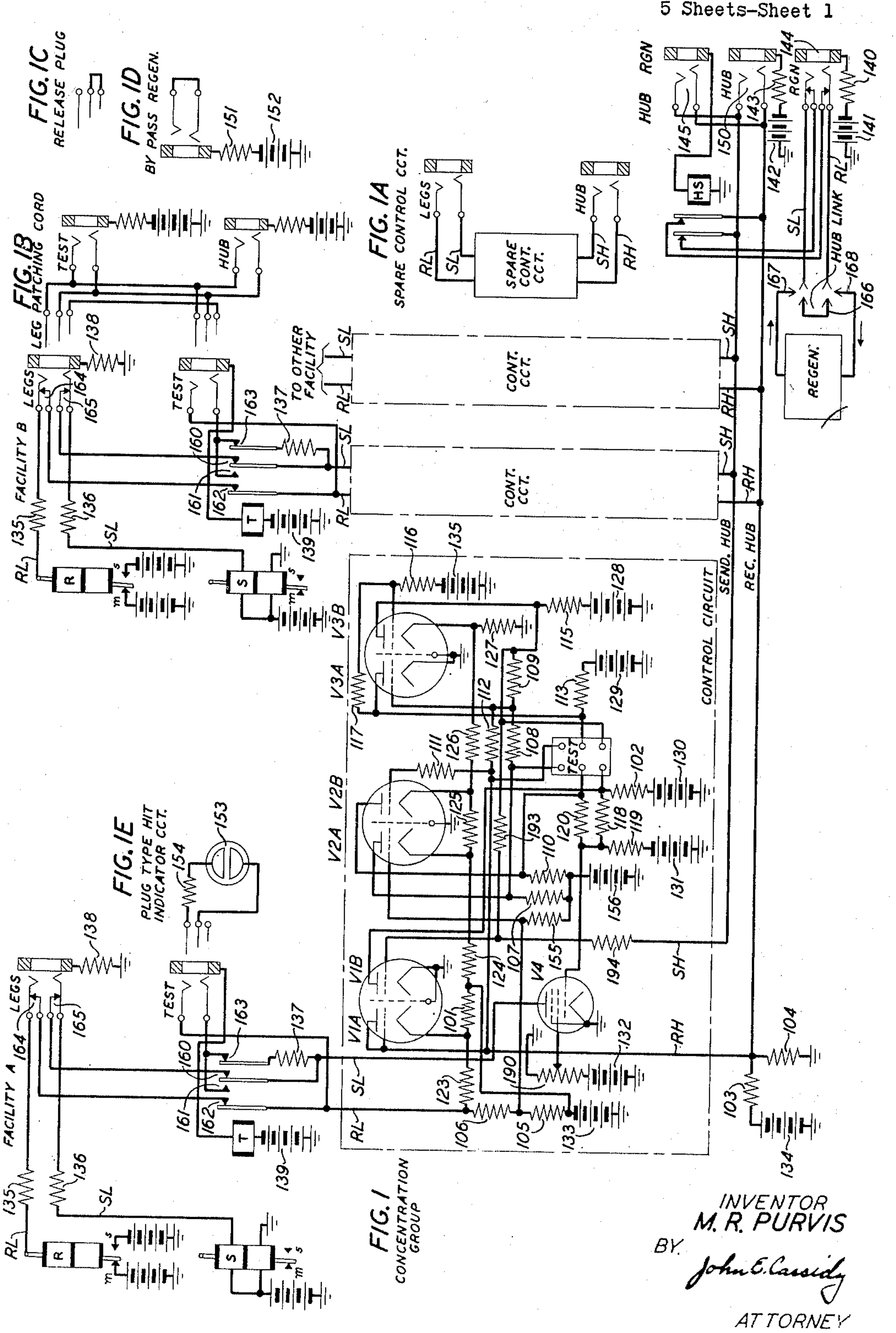
Fig. 1 represents a concentration group comprising three legs or facilities. The concentration jack circuits of only two of the legs are shown and only one control circuit is shown in detail.
Fig. 1A shows a spare control circuit which would be required for adding an additional leg to the concentration group.
Fig. 1B shows a patching cord circuit.
Fig. 1C shows a release plug circuit.
Fig. 1D shows a by-pass regenerator circuit.
Fig. 1E shows a plug type hit indicator circuit.

The concentration group or telegraph network which operates on a half duplex basis and which is represented by Fig. 1 will now be described. The concentration group shown includes three control circuits each of which is assigned to a repeater serving either a loop to a subscriber station or a line facility to a distant office. This concentration group is located in a telegraph office and the jack circuits shown appear in a service board in the office. From the telegraph office where the concentration group is terminated, each line repeater is assumed to be capable of operating full duplex to another telegraph office in which case a line facility interconnects the two offices. In the case of a facility which extends from the telegraph office to a subscriber station, a loop interconnects the station and the telegraph office and a loop repeater (usually half duplex) is associated with each loop at the telegraph office. As the leg sides of line and loop repeaters are identical, the termination in the concentration group is the same for either type of repeater.

The receiving and sending leg of each repeater extends through resistances to the concentration jack circuit consisting of jacks Legs and Test and relay T. From the concentration jack circuit the legs extend to the leg side of a control circuit, each control circuit being identical with the other, the control circuit of facility A in Fig. 1 being the only one shown in detail. The hub side of each control circuit is connected to the two common hub conductors, the receiving hub lead of each control circuit connecting to the receiving hub and the sending hub lead of each control circuit connecting to the sending hub.

Although three facilities are shown associated with the concentration group of Fig. 1 the number of such legs or branches is not limited to three but may range from a minimum of two to an unlimited number depending on the impedance of the hub circuit. The receiving hub is held to a potential of +40 volts for the marking condition by the potentiometer consisting of battery 134 and resistances 103 and 104. The values of resistances 103 and 104 are relatively high so that if a negative or spacing potential, which may be for instance −130 volts, is applied to the receiving hub through the same value of impedance, the hub voltage will become, for instance, −40 volts. If a regenerative repeater is not furnished, the sending and receiving hubs are strapped together through the hub link 166 shown at the lower right and the voltage of the receiving hub is impressed on the sending hub. If a regenerative repeater is provided, the hub link 166 is omitted and the two conductors 167 and 168 are employed. The regenerative repeater responds to signals, voltage fluctuations, on the receiving hub and repeats regenerated signals to the sending hub.

Signals received from facility A actuate polar telegraph receiving relay R of the repeater which connects positive battery to the receiving leg for the marking and negative battery for the spacing condition. It should be noted that the same numbers have been assigned to corresponding items of apparatus in the repeaters and concentration jack circuits of facilities A and B, Fig. 1. The signals pass through resistance 135, in facility A, through the tip and normal spring contacts 164 of the Legs jack, back contacts 162 of relay T and via lead RL to the control circuit. The control circuit of facility A repeats the signals to and receiving hub from which they pass to the sending hub either directly via the hub link or through a regenerative repeater. From the sending hub the signals are transmitted over the sending hub lead SH of each control circuit associated with the network. The control circuits of facilities B and C repeat the signals to their associated repeaters over the sending legs SL, through back contacts 160 of relay T, ring spring contacts 165 of the Legs jack, resistance 136 and the line winding of the respective telegraph sending relay S in each facility to positive battery. This causes each S relay to respond to the signals and to repeat them outward over the line or loop facility. The signals received from the A facility are therefore transmitted to all other facilities which are connected to the same network or concentration group. It is important however, that the signals received from facility A are not repeated back to the sending relay of the repeater of facility A as this would interfere with transmission from the sending station. This undesirable reflection of signals is prevented by the control circuit. Operation of the control circuit will now be described.

*Operation of control circuit*

Transmission of signals from the repeater through the control circuit to the receiving hub will first be described. The receiving leg RL of the repeater of facility A which has been traced into the control circuit, continues therein through resistance 123 to the cathode of tube V1A. The branch of RL which extends through resistance 186 in the control circuit will be discussed later. Tube V1A is used as a rectifier. Its function is to isolate, during the marking interval, the receiving leg RL, of the facility A, which is at +130 volts, from the receiving hub, REC Hub which is held at +40 volts by the hub potentiometer consisting of battery 134 and resistances 103 and 104. This isolation is effected because the cathode of the tube V1A for the marking condition is mode positive than the plate of the tube. This permits the connection of an almost unlimited number of legs to one hub, since in normal operation only one facility will be effectively connected electrically to the hub. This is while the particular facility is transmitting a −130-volt spacing signal toward the hub. The one facility which is transmitting therefore toward the hub, and only while it is transmitting a spacing signal, effects a flow of current from the hub through the signal V1A tube in the control circuit associated with the particular facility. During normal transmission all other V1A tubes in other control circuits are blocked for both the marking and spacing signaling conditions and there is therefore no limitation as to the number of facilities connected to a hub. The receiving circuit extends from the plate of tube V1A through the individual control circuit conductor RM to the common receiving hub REC Hub. The RM leads of all control circuits associated with a given telegraph hub concentration are connected to the receiving hub. Since lead RH of each control circuit is an open circuit for the marking condition due to the condition of the rectifying tube V1A, the combination of a number of RM leads to form a hub would have no voltage on it when all receiving relays are in the marking condition were it not for the before-mentioned hub potentiometer which raises the hub voltage to +40 volts.

When the R relay of the repeater of facility A operates to pacing, −130-volt battery is connected via lead RL and resistances 135 and 123 to the cathode of tube V1A, causing the tube to conduct. Negative 130-volt potential is applied through resistance 101 and the plate circuit of tube V1A to the receiving hub. The impedance of this circuit between battery 133 and the hub is approximately 6000 ohms. As the hub potentiometer also has a resistance to ground of approximately 6000 ohms, the resulting hub voltage for the spacing condition is approximately −40 volts. Thus, the receiving hub voltage +40 for a mark and a −40 for a space. If the receiving relays of two facilities such as facilities A and B, Fig. 1 should go spacing simultaneously, the effect would be the safe as if −130-volt battery were connected to the receiving hub through a 3000-ohm resistance. In this case, the hub voltage would be approximately −69 volts. This higher negative hub voltage serves to provide the double space by-pass feature which will be described later.

Transmission from the sending hub through the control circuit to the sending leg of the repeater will now be described.

When a regenerative repeater is not used, the receiving hub is connected directly to the sending hub. The marking and spacing voltages on the sending hub are therefore +40 and −40 respectively. When a regenerative repeater is used, the output of the repeater is arranged to produce +40 and−40 volts on the sending hub for the marking and spacing conditions, respectively. If a marking condition exists on the sending hub, +40 will be applied via the SH lead and resistance 194 to the grid of tube V1B.

It is on the grid of tube V1B that the so-called flip-flop circuit which includes tubes V3A and V3B applies its blocking effect to the sending side of the circuit, either holding the grid positive against a negative spacing signal −40 volts from the sending hub, or allowing the spacing signal to control the tube. It will be assumed at this time, however, that the flip-flop circuit is disconnected and the operation of the sending side of the circuit will be explained without including it. A positive or marking voltage from the sending hub causes tube V1B to conduct. When tube V1B is conducting, its plate voltage is approximately +25 volts and this voltage is applied to the grid of tube V4 through resistance 118. At this time, three voltages are applied to the grid of tube V4. First, +25 volts from the plate of tube V1B and resistance 118; second, −130 volts from battery 131 and resistance 119; and third, −25 volts through resistance 120 from the plate circuit of tube V2B, which is conducting. Tube V2B conducts at all times except when the receiving hub receives space signals from two or more control circuits simultaneously. The plate voltage of tube V2B is reduced from +130 for the non-conducting to −25 volts for the conducting condition. The function of tube V2B will be explained in connection with the double-space by-pass feature. A combination of the above three voltages applied to the grid of tube V4 through their respective resistances results in a voltage of −22 volts on the grid of tube V4, which causes this tube to be non-conducting. With tube V4 non-conducting, no plate current flows and accordingly, there is no current in the line winding of the S relay of the repeater of facility A. The 15-mil marking current in the bias winding of the S relay holds this relay in the marking condition.

A spacing condition on the sending hub due to a space received from any facility, causes −40 volts to be applied through resistance 194 to the grid of tube V1B. As the flip-flop circuit is assumed to be disconnected, this −40 volts causes tube V1B to become non-conductive in which condition its plate voltage is +130. This plate voltage is applied to the grid of tube V4 through resistance 118 and it combines with −130 volts applied through resistance 119 and the −25 volts applied through resistance 120 to produce a resultant voltage of +22 on the grid of tube V4. This causes tube V4 to conduct.

When tube V4 is conducting, a plate current, adjusted to 30 mils by potentiometer 190 which is associated with the screen of the tube, flows in a spacing direction in the line winding of the S relay and causes this relay to operate to spacing. The +40 volt marking potential on the sending hub therefore causes no current to flow in the line winding of the S relay and the −40 volt spacing potential causes a spacing current of 30 mils to flow, resulting in inverse neutral transmission to the S relay. Tube V1B is employed to invert the positive and negative signals from the sending hub so that for the positive or marking condition of the hub, tube V4 is non-conducting and for the negative or spacing condition, it is conducting.

The flip-flop circuit will now be described. This circuit is composed of tubes V3A and V3B. The plate of tube V3A is linked to the grid of tube V3B through resistance 117. The plate of tube V3B is linked to the grid of tube V3A through resistance 109. The circuit operates on the basis that when tube V3A is conducting, tube V3B is non-conducting and vice versa, and that either condition will be maintained until an external voltage is momentarily applied to flip the circuit. The circuit is comparable to a toggle switch, which has two positions of rest and is changed from one to the other position by an external force.

To illustrate the action of the flip-flop circuit, it will be assumed that a momentary application of positive voltage to the grid of tube V3A has caused this tube to conduct in which case its plate voltage is +25. This plate voltage is applied through resistance 117 to the grid of tube V3B where it combines with −130 volts applied through resistance 116 to produce a voltage of −50 on the grid of the tube. This causes tube V3B to be non-conducting and the voltage at its plate is +130. The +130 volt plate potential of tube V3B combines with the other voltages applied to the grid of tube V3A to produce a positive voltage on the grid. With a positive voltage from tube V3B now applied to its grid, tube V3A will continue to conduct after the initial positive voltage which was assumed to have started its conduction, has been removed. Tube V3B, the grid of which is controlled by the condition of tube V3A will accordingly remain non-conducting.

To operate the flip-flop circuit to its other position, a momentary negative voltage will be assumed to be applied to the grid of tube V3A, causing it to become non-conducting. With tube V3A non-conducting, the voltage at its plate becomes +130 and this is applied through resistance 117 to the grid of tube V3B. When combined with the negative potential from battery 135 and resistance 116, the positive 130 volt plate potential of V3A causes the grid of tube V3B to be at 0 potential. As the cathode of tube V3B is at −30 volt potential the tube will conduct. When tube V3B is conducting its plate voltage is −5. This change in the plate potential of tube V3B from +130 to −5 is applied to the grid of tube V3A through resistance 109 and this negative voltage swing when combined with the voltages from the branches which include resistances 108 and 112 causes the grid voltage to swing from +27 volts to −8. The resultant negative voltage on the grid of V3A causes this tube to remain non-conducting after the negative voltage which was assumed to make it non-conducting has been removed.

When tube V3B is conducting, the voltage at its plate is −5. This voltage in addition to being connected back to the grid of tube V3A is also connected through resistance 193 to the grid of tube V1B. Since this voltage is small, it has little effect on the grid of tube V1B and the sending hub voltages ±40 volts can control tube V1B as though the voltage from the flip-flop circuit were not present. With the flip-flop circuit in this condition, with tube V3B conducting, the passage of signals through tube V1B is not blocked.

When tube V3B is non-conducting, the voltage at its plate is ±130 volts. This high positive voltage, when applied through resistance 193 to the grid of tube V1B, is sufficient to keep the grid of the tube positive even when the voltage applied to the grid from the sending hub is −40 volts. When this condition exists, tube V3B of the flip-flop circuit holds tube V1B in a continuously conducting condition and accordingly blocks the passage of signals on the sending side of the control circuit.

The summary of the function of tube V3B of the flip-flop circuit in controlling the sending side of the control circuit is that when tube V3B is conducting, the sending side is unblocked and when tube V3B is non-conducting, the sending side is blocked.

The flip-flop circuit functions in such a manner that tube V3B becomes non-conducting when the receiving relay of the associated repeater is transmitting. This applies +130 volts to the grid of tube V1B and blocks the signals from going over the sending leg to the repeater.

When the receiving relay of a facility other than facility A, such as facility B or C, transmits, the flip-flop circuit of facility A should operate to the condition under which tube V3B is conducting, in which case the voltage applied to the grid of tube V1B is −5 volts and the operation of the tube is not affected. The above functions are accomplished by connecting the grid of tube V3A so that it can be controlled either by the receiving relay of its associated repeater or by a receiving relay of any other repeater connected to the concentration group.

When a space is transmitted to the receiving hub by a repeater other than the one associated with the control circuit of facility A, the shift in hub potential from +40 to −40 volts is applied to the grid of tube V3A through resistance 112. This causes tube V3A to become non-conducting, tube V3B is made to conduct and tube V1B is unblocked. Signals from the other repeater are therefore transmitted from the receiving to the sending hub and through the control circuit and sending leg to the sending relay of the repeater of facility A. When the receiving relay of the repeater of facility A operates to space, it would tend to cause tube V3A to become non-conducting and tube V3B to become conducting due to the negative swing in the potential of the receiving hub. With the flip-flop circuit in this condition there would be nothing to prevent the space from being reflected back to the sending station. This condition is corrected and tube V3B is made non-conducting through the action of tube V2A, the purpose of which is to convert the positive to negative voltage swing of the RL leg for a mark to space transition to a negative to positive voltage swing which is applied to the grid of tube V3A to make this tube conduct and tube V3B to be non-conducting.

The action of tube V2A will now be described. When the voltage on the armature of relay R is positive, the voltage on the grid of tube V2A will be positive with respect to the cathode and the tube will conduct. The plate voltage of tube V2A will be −75 at this time. When the voltage on the armature of relay R swings from +130 to −130 volts for a mark to space transition, tube V2A becomes non-conducting and its plate voltage changes from −75 to +130 volts. This corresponds to a positive swing of 205 volts. When relay R goes spacing the voltage on the receiving hub changes from +40 to −40 volts and this swing of 80 volts negative is applied through resistance 112 to the grid of tube V3A. The positive 205 volt swing applied through resistance 108 overrides the negative 80 volt swing applied through resistance 112, however, and the net effect is that the grid of tube V3A is at a potential of +44 volts and the tube conducts. It should be noted that the flip-flop circuit will remain in this condition with the tube V3A conducting even though the hub potential should fall to −69 volts by reception of a spacing impulse from another facility simultaneously. In this case the potential of the grid of tube V3A will be held to +28 volts and the tube will continue to conduct.

When tube V3A is conducting, tube V3B is non-conducting and the resulting application of +130 volts from the plate of tube V3B to tube V1B holds the latter tube in the conducting condition against −40 volts from the sending hub which is applied to the grid of tube V1B through resistance 104. Signals from the receiving leg of the repeater are thus blocked from going out on the sending leg. When the signals have ceased to be transmitted to the receiving hub from any of the connected facilities, the flip-flop circuit will remain unchanged. The start of signals from another facility will then operate the flip-flop circuit to its opposite condition.

The double-space by-pass feature will now be described.

When relay R of facility A is sending a space to the control circuit, the flip-flop circuit is operated so as to block the passage of signals on the sending side of the circuit. The flip-flop circuit will remain operated in this manner as long as relay R is sending a space even though another sending relay on the hub should also operate to space. This is because the voltage swings on the grid of tube V3A are designed so that relay R of facility A will have control of the flip-flop circuit over the influence of the other receiving relays associated with the hub.

It is desirable however, whenever another receiving relay on the hub goes to spacing at the same time as relay R of facility A, that the space signal of the other relay be transmitted from the sending hub to the sending relay of facility A. This is for the purpose of mutilating the home copy of the distant sender of facility A. It indicates to the sender that another station has sent simultaneously on the concentration group. This is called the double-space by-pass feature and is accomplished by tube V2B which provides a by-pass around the block established by the flip-flop circuit.

The action of the by-pass circuit is described as follows:

The cathode of tube V2B is at a potential of −50 volts and the grid is connected to the receiving hub via resistance 111. The normal marking and spacing voltages on the receiving hub of +40 and −40 volts leave tube V2B in the conducting condition. In the conducting condition, the voltage at the plate of tube V2B is −25. This voltage is applied through resistance 120 to the grid of tube V4 and since it is small compared to the −130 volts applied through resistance 119, it has no effect on the operation of tube V4. When two spaces exist simultaneously on the receiving hub, the voltage on the hub becomes −69. This negative voltage when applied to the grid of tube V2B causes the tube to become non-conducting in which case its plate voltage is +130. The 155-volt swing in the positive direction −25 to +130 of the voltage applied through resistance 120 to the grid of tube V4 changes the potential on the grid from −22 volts to a positive value and the tube conducts. With tube V4 conducting, the sending relay of the repeater is operated to spacing and a space signal is sent back to the distant point even though that point is sending a spacing signal simultaneously to the control circuit.

The above description of the control circuit of facility A applies to any control circuit assigned to the hub such as that associated with facility B or C. The description also applies to a spare control circuit which might be added to the hub circuit in conjunction with a spare line or loop facility on a patched basis. The voltage values which have been used in the above description are typical voltages and are given merely to explain the manner in which the circuit operates.

*Substitution of facilities—Figs. 1, 1A and 1B*

The concentration jack circuit provides for the substitution of line and loop repeaters, and the hub jack circuit provides for the substitution of regenerative repeaters. Substitution of these facilities becomes necessary chiefly because of trouble in the facility. Substitution of line and loop facilities is accomplished in the same manner. The method is as follows:

Let it be assumed that a trouble condition exists in the line or loop associated with facility A and that a spare line or loop facility is to be substituted for facility A in Fig. 1. This is accomplished by patching the Legs jack of a suitable spare line or loop facility to the Test jack of facility A by means of the leg patching cord circuit of Fig. 1B. The Legs jack of the spare facility is similar to that of assigned facility A which is now to be disconnected from the concentration group and replaced by the spare facility. Current flows from the ground on the sleeve of the Legs jack of the spare facility which is similar in its jack arrangements to all facilities, such as facility A or B, through resistance 138, the sleeve circuit of the patching cord, Fig. 1B, sleeve of the Test jack of facility A and through the winding of relay T to battery 139 causing relay T in facility A to operate. Operation of relay T disconnects the RL and SL leads of the facility A, which is to be replaced, from the control circuit. The RL lead from the spare facility now extends from the tip of the spare Legs jack, over the tip conductor of the patching cord to the tip of the Test jack of facility A and over the RL lead to the control circuit. Likewise the SL lead from the spare facility extends from the ring of the spare Legs jack, over the ring conductor of the patching cord, the ring of the Test jack of facility A, make contacts 161 of relay T of facility A and the SL lead to the control circuit. The spare facility is thereby substituted for the normally assigned facility A. The line or loop repeater of facility A is no longer connected to the concentration group but now terminates on the tip and ring of the Legs jack of facility A from which it may be patched for test purposes or for use elsewhere as a spare after the trouble has been cleared.

A spare regenerative repeater may be substituted for either an assigned regenerative repeater or a hub link. The hub jack circuit of Fig. 1 provides for the substitution of a regenerative repeater to replace an assigned hub link at any time that regeneration is required owing to transmission degradation. The method of substituting a spare regenerative repeater for another regenerative repeater is the same as that required when a hub link is to be replaced by a spare regenerative repeater. The procedure is as follows:

A spare regenerative repeater terminates in a jack similar to jack 144 which is designated RGN. The RGN jack of a spare regenerative repeater is patched to jack 145 which is the upper hub jack designated Hub RGN. The patch is made by means of a leg patching cord circuit similar to that of Fig. 1B. Current flows from battery 141 through resistance 140, the sleeve of jack 144, over the sleeve of the patching cord to the sleeve of jack 145, and through the winding of relay HS to ground. This causes relay HS to operate and disconnect the SL and RL conductors of the assigned regenerative repeater or hub link from the sending and receiving hubs. At the same time the SL lead of the spare regenerative repeater will be connected through the tip conductor of the patching cord and the tip of jack 145 to the sending hub. Likewise the RL lead of the spare regenerative repeater will be connected through the ring of the patching cord to the receiving hub. The spare regenerative repeater will therefore replace the assigned regenerative repeater or hub link and it will receive signals from the receiving hub, regenerate them and send them to the sending hub.

*Addition of facilities*

It is particularly pointed out that there is a difference in operation between the substitution of a facility for one already forming part of a concentration group and the addition of a facility to a concentration group. Substitution was described in the foregoing. In the case of substitution it should be apparent from the foregoing that the facility which is disconnected is separated from its control circuit and this control circuit is employed by the facility that is substituted for the disconnected facility. When a facility is added, however, as distinguished from substituted, there is no disconnected control circuit, forming part of the original concentration group, available to serve with the added facility and another must therefore be supplied as will become apparent in the following.

Line and loop facilities are added in the same manner and the addition of a facility requires the use of a spare control circuit since it is impractical to assign extra control circuits to a concentration group to anticipate additions. In this description it is assumed that a regenerative repeater is never added, as distinguished from substituted; because if a regenerative repeater is not normally assigned to a concentration group the use of a spare regenerative repeater at some later time on a patched basis amounts to a substitution as the spare regenerative repeater is substituted for the assigned hub link such as 166.

The manner in which line and loop facilities are added will now be described.

The Legs jack of a suitable spare facility, line or loop, such as facility A or B assuming it has been released from service by a substitution as previously described, is patched to the Legs jack of a spare control circuit similar to that shown in Fig. 1A. The Hub jack of the spare control circuit Fig. 1A is next patched either to Hub jack 150 or the Hub RGN jack 145. Both patches are made using a patching cord similar to that shown in Fig. 1B so that two Figs. 1B are required for the addition of a facility. Signals incoming from the added facility will pass through the first patching cord per Fig. 1B, through the RL lead of Fig. 1A into the control circuit, represented by the rectangle in Fig. 1A, and then from the control circuit over the RH lead through the second patching cord per Fig. 1B through the Hub jack 150 or Hub RGN jack 145 to the receiving hub. Likewise signals from the sending hub will pass from the sending hub (Send Hub) through jack 150 or 145, Fig. 1B, over the SH lead into the control circuit in Fig. 1A and, if they are not blocked in the control circuit, they will be transmitted over the SL lead into the second patching cord per Fig. 1B into the legs jack of the added facility. Relay HS of the hub jack circuit will not be operated if the patch has been made to the Hub RGN jack because there is no sleeve connection to the Hub jack of the spare control circuit per Fig. 1A.

*Releasing facilities from the concentration group*

A line or loop facility such as that of facility A normally assigned to a particular hub concentration group may be released from the concentration group to which it is assigned by the following method:

The release plug of Fig. 1C is plugged into the Legs jack of the facility to be released. This opens the tip and ring contacts of the Legs jack thereby disconnecting the facility from the concentration group. It also connects ground through sleeve resistance 138, through the release plug to the ring of jack Legs, via the SL lead and through the line winding of relay S in the repeater to positive battery. Current flows through the line winding of the S relay causing it to operate to spacing. A continuous spacing signal is thereby transmitted outward over the released facility to notify the distant office or station that the facility has been released.

An assigned regenerative repeater may be released from its assigned concentration group in the following manner:

To release an assigned regenerative repeater from its concentration group, a By Pass Rgn. jack similar to that of Fig. 1D is patched to the Hub RGN jack of the concentration group. The patch is made using a patching cord of the type shown in Fig. 1B. The strap between the tip and ring of the By Pass Rgn. jack serves to interconnect the sending and receiving hubs to replace the regenerative repeater connection. Current from battery 152 on the sleeve of the By Pass Rgn. jack flows through resistance 151, to the sleeve and through the sleeve conductor of the patching cord to the sleeve of the Hub RGN jack and through the winding of relay HS to ground. This causes relay HS to operate and disconnect the assigned regenerative repeater from the sending and receiving hubs. The assigned regenerative repeater, now released, is available for use elsewhere on a patched basis and may be patched out from the RGN jack.

*Repatching released facility*

When a released regenerative repeater is disconnected from one hub concentration group and connected to the Hub RGN jack of another concentration group, current flows from battery 141 through resistance 140, over the sleeve conductor of the RGN jack and of the patching cord, Fig. 1B, to the sleeve of the other Hub RGN jack such as 145 of the other concentration group and through the winding of the HS relay therein to ground. This causes the HS relay in the other concentration group to operate and cut off the regenerative repeater or hub link normally associated with the other concentration group as the case may be.

A line or loop facility released from a particular concentration group may be patched as a spare for use in another concentration group by patching the Legs jack of the spare facility to the Test jack of a facility which is to be disconnected from the concentration group if the patch is a substitution or to the Legs jack of a spare control circuit if the patch is an addition. In the case of an addition it is of course necessary to patch the Hub jack of the spare control circuit to one of the Hub jacks associated with the concentration group as described in the foregoing.

*Hit indication*

A plug type hit indicator may be used to observe hits or spacing pulses which might occur on any line or loop facility while it is not transmitting toward the receiving hub. Such a hit indicator is shown in Fig. 1E. The indicating device is the neon tube 153 which is in series with the resistance 154. The plug is connected to the Test jack of the facility to be observed for hits. The neon tube will flash whenever the armature of the associated receiving relay R operates to spacing. The neon tube will accordingly respond to signals received from the facility and for this reason hits cannot be observed when the facility is transmitting. When the armature of relay R operates to spacing it connects negative battery to the RL lead and current flows from the armature of the relay through resistance 135, the tip spring of jack Legs, back contacts 162 of relay T to the tip of jack Test, through the tip of the plug in Fig. 1E, resistance 154, through tube 153, ring of plug in Fig. 1E, ring of Test jack, through back contacts 163 of relay T, resistance 137, through back contacts 160 of relay T, ring spring of jack Legs, resistance 136 and via the SL lead and line winding of relay S to positive battery. Tube 153 lights but resistance 154 limits the flow of current and prevents relay S from operating. When a mark is being received from relay R the armature connects positive battery to the RL lead and since both sides of tube 153 are connected to positive battery current does not flow and the neon light remains unlighted.

*Monitoring in concentration jack or hub circuit*

When it is desirable to monitor on communication in the hub circuit this may be accomplished by connecting either the attendant's teletypewriter cord circuit per Fig. 4 or the attendant's manual telegraph cord circuit per Fig. 5 to the Hub jack 150 of a concentration group. The receiving element of the cord circuit will respond to signals which appear on the sending hub. These signals may be received from any facility connected to the concentration group with the exception of receiving only facilities which are not equipped with receiving legs. If it is desirable to monitor signals that are received from a particular facility connected to the concentration group this can be accomplished by connecting the attendant's teletypewriter or attendant's manual telegraph cord circuit to the Test jack of the particular facility to be monitored. This requires operation of the full-half duplex key FDX—HDX in the particular cord circuit to prevent signals from the hub from affecting the receiving element in the cord circuit. Operation of the attendant's teletypewriter cord circuit per Fig. 4 and the attendant's manual telegraph cord circuit per Fig. 5 will be described later. When either communication cord circuit is connected to the Test jack of a facility in a concentration group, relay T in the sleeve circuit of the associated concentration jack circuit will not operate because of insufficient current flow. Signals received from the telegraph receiving relay R of the facility will pass through resistance 135, the tip springs of the Legs jack, back contacts 162 of relay T to the tip of the Test jack. From the tip of the Test jack the signals pass into the tip of the cord circuit and actuate the receiving element as will be explained later. Signals transmitted from the hub pass through the control circuit, over the SL lead, resistance 137 and back contacts 163 of relay T to the ring of jack Test. These signals pass into the ring of the cord circuit but are prevented from actuating the receiving element, if desirable, by operation of the half-full duplex key in the cord circuit as will be described later. In the case of a substituted facility the communication cord circuit per Fig. 4 or 5 cannot be connected to the Test jack because a patching cord circuit has been connected to this jack, as explained, in order to effect the substitution. In this case the communication cord circuit is connected to the Test jack of the patching cord circuit. Likewise in the case of an addition, the communication cord circuit per Fig. 4 or 5 cannot be connected to the Hub jack because of the patch to the Hub jack necessary to effect the addition, as described. In this case the communication cord circuit is connected to the Hub jack of the patching cord circuit for monitoring.

*Communication*

The communication cords, namely the attendant's teletypewriter cord circuit per Fig. 4 and the attendant's manual telegraph cord circuit per Fig. 5 may be connected to the following jacks for communication purposes:

1. The Legs jack of a concentration jack circuit to split off the facility and communicate with the split-off facility. In this case the facility is split off from the concentration group by opening of the tip and ring contacts of the Legs jack. The RL and SL leads from the facility are connected to the tip and ring of the communication cord respectively.
2. The Test jack of a concentration jack circuit for communication with the concentration group in which case the facility is split off from the concentration group by operation of relay T.
3. The Hub jack of a concentration group per Fig. 1 or a patching cord circuit per Fig. 1B for communication with the group.

The operation of the communication cord circuits will be described later.

*Transmission measurements*

Transmission measurements are made in any concentration group by connecting a communication cord per Fig. 4 or Fig. 5 to a Legs, Hub or Test jack of Fig. 1 and patching a transmission measuring set to the transmission measuring jack, TMS jack, of the communication cord circuit shown at the upper right in each of Figs. 4 and 5. This will be described in detail hereinafter in connection with the attendant's teletypewriter cord circuit and the attendant's manual telegraph cord circuit.

*Sending teletypewriter test signals—Figs. 2 and 3*

Teletypewriter test signals appear in the service board in the test signal supply circuit of Fig. 3.

Teletypewriter test signals can be patched to Legs jacks of facilities by either a leg patching cord circuit such as that of Fig. 1B or by means of the test signal cord circuit of Fig. 2. Leg patching cords are always used to connect the test signal supply circuit to Hub jacks.

The test signal cord circuit provides the following features which are of value when test signals are applied to the Legs jack of a facility:

A. It permits the attendant at the distant end of the facility who is observing the quality of the signals, to stop the transmission of signals by sending a break signal.

B. When transmission of signals is stopped by reception of a break signal a supervisory lamp is lighted in the test signal cord circuit per Fig. 2 and the auxiliary audible signal sounds until the local attendant answers by connecting a communication cord circuit per Figs. 4 or 5 to the TTY jack shown at the upper right in Fig. 2.

C. The local attendant may communicate with the distant attendant through the test signal cord circuit per Fig. 2 by means of his communication cord circuit per Fig. 4 or 5 connected to the test signal cord circuit.

D. The distant attendant may recall the local attendant and cause the supervisory lamp to light and the auxiliary signal circuit to sound in the test signal cord circuit per Fig. 2 while the local attendant's communication cord circuit per Fig. 4 or Fig. 5 remains connected to the TTY jack of Fig. 2.

When features A to D above are not required, a leg patching cord circuit per Fig. 1B is used to patch the test signals to a Legs jack. Since these features are usually not required when test signals are applied to the Hub jack of a concentration group, this patch is always made by means of a leg patching cord circuit and no provision is made for using the test signal cord circuit for this purpose.

*Test signal cord circuit and test signal supply circuit*

The operation of the test signal cord circuit per Fig. 2 and the test signal supply circuit per Fig. 3 will now be described in detail. Refer to Figs. 2 and 3.

The test signal supply circuit is patched to the Legs jack of the facility under test with the SIG cord of Fig. 2 connected to the SIGS jack of the test signal supply circuit per Fig. 3 and the Leg cord of Fig. 2 connected to the Legs jack of the facility per Fig. 1. Signals will not pass through the cord circuit per Fig. 2 to the Legs jack until the start signal key ST SIG has been momentarily depressed. Tube 209 will respond to signals on the tip of the Legs jack in Fig. 1 and if a mark is incoming the receiving relay R of the facility will connect positive battery to the RL leg and tube 209 will be held conducting. In this state relay P will be held operated as shown in Fig. 2. If a space is incoming over the facility the receiving relay R will connect negative battery to the RL lead and tube 209 will become non-conducting, permitting relay P to be released. Tube 209 is normally held conducting by the positive potential of battery 208 which is connected to the grid network, and relay P is thereby held operated when the cord is not in use as well as when the cord is in use and there is no voltage on the tip of the Legs jack. In this case condenser 207 is charged to the potential of positive battery 208. When a spacing signal is received from the facility, the negative potential applied to the tip of cord Leg in Fig. 2 causes condenser 207 to begin discharging through resistance 202 and the network consisting of resistances 202, 203, 205 and condenser 207 is so designed that if the spacing signal persists for approximately one second the voltage on condenser 207 will be sufficiently negative as to cause tube 207 to become non-conducting by lowering the potential of its grid. This insures that tube 209 will become non-conducting and relay P will be released whenever a two-second spacing signal which is employed as a break signal is received from the facility under test. It also prevents tube 209 from releasing relay P during reception of teletypewriter signals of normal duration from the facility. Momentary operation of key ST SIG causes relays ST and SS to operate over obvious circuits and to lock up. Relay SS locks with current flowing in its upper winding from battery 215, Fig. 2, through the upper closed contacts of relay SS, the sleeve circuits of cord SIG and jack SIGS, Fig. 3, and through the windings of relays A, B and S to battery 221 which is oppositely poled to battery 215. The voltage of battery 221 is lower than that of battery 215. This current in addition to holding relay SS, Fig. 2 operated, also causes polar relay A and relay B, Fig. 3, to operate so as to close their respec- contacts. Polar relay S of Fig. 3 remains released because current flow for this condition is in the wrong direction to cause its operation. Relay ST, Fig. 2, locks up with current flow from ground through its winding and upper closed contacts, the lower operated contacts of relay P and the lower operated contacts of relay SS to battery 214. Operation of relay ST closes the transmission circuit between the tip of cord SIG to the ring of cord Leg which includes resistance 201. It also opens circuits through its bottom back contacts so as to prevent the supervisory lamp 213 from lighting and the auxiliary signal circuit from sounding at this time.

Relays A and B, Fig. 3, in operating, cause relays A1 and AB to operate over obvious circuits. Relays A1 and AB when operated connect ground through their bottom make contacts to lead ST which starts the multiple sender or other source of signals well known in the art, indicated by a rectangle. Test signals transmitted by the multiple sender, now pass over lead T through resistance 222, upper inner operated contacts of relay A1, lower inner operated contacts of relay AB to the tip of jack SIGS and through the tip of cord SIG, Fig. 2, and the upper outer make contacts of relay ST to the ring of cord Leg and into the facility under test. The type of transmission is inverse neutral. The sending source indicated by the rectangle in Fig. 3 connects positive potential to lead T, Fig. 3, for a mark and negative potential for a space. The line winding of sending relay S in the facility per Fig. 1 is terminated in positive battery so current does not flow through the line winding of this relay for the marking condition. The relay is operated to marking by its biasing winding, the lower winding in Fig. 1. Current flows through the top winding of relay S for the spacing condition and this current has aproximately twice the value of that flowing in the biasing winding. As the line current is in a spacing direction, it operates the sending relay to spacing in opposition to the effect of the lower biasing winding. In passing from the multiple sender, Mult SDR, Fig. 3 through the test signal supply and test signal cord circuits and over the sending leg SL to the line winding of relay S, the spacing line current passes through resistance 222 in the test signal supply circuit, resistance 201 in the test signal cord circuit and resistance 136 in the SL lead of the facility per Fig. 1. These resistances are provided to adjust this current to the optimum value for operating the S relay. The S relay will respond at a standard rate of operation to the test signals and repeat them over the facility to the distant point where the bias and distortion will be observed and measured.

When the distant attendant has finished his observations, he sends a two-second break signal which enters the test signal cord circuit over the tip of cord Leg and causes tube 209 to stop conducting in the manner previously described. Relay P releases and opens the locking circuit of relay ST causing its release. Relay ST in releasing will stop the transmission of signals. Supervisory lamp 213 will light steadily and the auxiliary signal circuit will sound an alarm. Although tube 209 will conduct again at the end of the break, which is a space signal, and thereby cause relay P to reoperate, relay ST will remain in the released condition.

The local attendant may wish to communicate with the distant attendant before taking down the patch. If so, he connects the teletypewriter or telegraph cord circuit per Figs. 4 or 5 to the TTY jack at the upper right in Fig. 2. When the communication cord circuit is connected to the TTY jack, relay A, Fig. 2 is operated from ground on the normal contacts of the TTY jack. Relay A in operating opens the circuit through its bottom back contact through which the supervisory lamp was lighted and the audible signal was sounded as heretofore described. It also prepares an alternative circuit for lighting the supervisory lamp and sounding the auxiliary signal alarm as soon as relay P is again released by an incoming recall signal which is a spacing signal of long duration. If such a recall is received, the lamp and alarm signals will be locked in. This is accomplished by the fact that in operating, relay A prepares a path at its upper make contact whereby negative battery 212, Fig. 2, is connected to the grid of tube 209 as soon as relay P is released by an incoming recall signal. The connection of battery 212 directly to the grid of tube 209 holds the tube in the non-conducting condition after the space or recall signal that caused it to become non-conducting is no longer present. This feature insures that the lamp and alarm signals will respond to the recall signal and continue to attract attention even though the local attendant has connected his telegraph cord TLG, Fig. 5, or teletypewriter cord, TTY, Fig. 4, to the test signal cord circuit. The local attendant may cut off the lamp and auxiliary signal alarms by momentarily disconnecting his communication cord circuit from the TTY jack. This releases relay A, Fig. 2, momentarily and permits tube 209 to become conductive, providing a marking signal is being received from the facility.

The local attendant may restart the test signals by momentarily depressing the start signal key, ST SIG, which reoperates relay ST. With the TTY cord of the teletypewriter cord circuit per Fig. 4 connected to the TTY jack of Fig. 2, the local attendant may monitor the outgoing test signals. By connecting a transmission measuring set, not shown, but well known in the art, to the transmission measuring jack TMS at the upper right in the teletypewriter cord circuit per Fig. 4, the bias and distortion of the outgoing signals may be observed and measured.

Upon completion of the tests, the patch involving the test signal cord circuit is taken down. Disconnection of the signal cord, SIG, Fig. 2, from the signals jack SIGS, Fig. 3, opens the locking circuit for relay SS, Fig. 2, and this relay is released.

When a leg patching cord circuit similar to that of Fig. 1B is used to patch the test signal supply circuit per Fig. 3 to the Legs jack of a facility, current flows from battery 221, Fig. 3, through the windings of relays S, B and A, through the sleeve circuit of the leg patching cord circuit per Fig. 1B and through resistance 138, Fig. 1, to ground. This current flow causes the armature of relay S, Fig. 3, to engage its contact but relays A and B remain released as the current is in the wrong direction to operate polar relay A and it is not of sufficient value to operate relay B. Operation of relay S connects ground to lead ST in Fig. 3 and starts the source of test signals. The signals immediately pass over lead T, through resistance 222, upper back contacts of relay A1, resistance 216 to the ring of jack SIGS, Fig. 3. Continuing over the ring conductor of the leg patching cord circuit per Fig. 1B into Fig. 1, the signals pass over the sending leg SL to the S relay of the facility. Transmission is identical in this case to that previously described when the patch is completed using a test signal cord circuit. No provision is made for the distant attendant to stop the test signals automatically when the leg patching cord circuit is used.

A leg patching cord circuit per Fig. 1B may be used to connect the SIGS jack of the test signal supply circuit, Fig. 3, to the Hub jack of a concentration group in Fig. 1, in order to send test signals to the entire group. In this case current flows from battery 221, Fig. 3, through the windings of relays S, B and A and over the sleeve of the leg patching cord circuit per Fig. 1B, into Fig. 1 through the Hub jack and through resistance 143 to battery 142 in the sleeve circuit of Fig. 1. Although battery 142 of Fig. 1 is poled so as to oppose battery 221 in Fig. 3, current will flow in the proper direction to operate polar relay A to engage its contact since the voltage of battery 221 is approximately one-half that of battery 142. The armatures of relays B and S will remain disengaged from their respective contacts because the current is in the wrong direction to actuate the armature of polar relay S to engage its contact and it will be of insufficient value to operate relay B. The closing of the contact of relay A causes relay A1 to operate over an obvious circuit. This connects ground through the bottom outer make contact of relay A1 to start lead ST, to start the source of test signals. The signals will now pass over lead T, through resistance 222, upper inner make contacts of relay A1, lower back contacts of relay AB, resistance 224, from cathode to plate of tube 217, upper outer make contacts of relay A1 to the ring of jack SIG. Negative battery 220 and resistance 219 are provided to protect the tube 217, by preventing the cathode of the tube from becoming too positive in potential with respect to the heater. From the ring of jack SIGS, Fig. 3, the signals pass over the ring of the leg patching cord circuit per Fig. 1B to the receiving hub which terminates on the ring of the Hub jack in Fig. 1. Tube 217 conducts only during transmission of spacing pulses and is not conducting during marking since for that condition its cathode becomes more positive than its plate which is at the hub marking potential of +40 volts. The tube therefore operates as a diode and during a mark the source of test signals is isolated from the hub which remains at its normal positive marking voltage. During a space the tube conducts and since its cathode is connected to a negative low impedance source, sufficient current flows from the hub potentiometer, formed by battery 134 and resistances 103 and 104, Fig. 1, to lower the hub voltage to approximately −40 volts.

*Attendant's teletypewriter cord circuit—Fig. 4*

The attendant's teletypewriter cord circuit is shown in Fig. 4. It is provided principally for the purpose of connecting the position teletypewriter, having sending contacts 302 and receiving magnet 339, to certain jack circuits in the service board for monitoring or communication. This circuit terminates in teletypewriter cord TTY 301 and when this cord is connected to a jack for monitoring or communication, the teletypewriter motor is started automatically with the patch. In addition to its monitoring and communication functions, this circuit also provides for making transmission measurements on any circuit to which the cord is connected when the transmission measuring set is connected to jack TMS. In certain applications the sending and receiving elements of the cord circuit are connected to the sending and receiving hubs and transmission is on a high impedance basis. In other cases the sending and receiving elements of the cord circuit are connected to the sending and receiving legs between the control circuit and the repeater in which case communication is on a low impedance basis. The cord circuit automatically distinguishes between jacks of the various types on the basis of the magnitude, and polarity of the sleeve voltage of the jacks. This is accomplished by means of the three relay selecting circuit including relays A, B and S which are in series in the sleeve of the cord circuit. Operation of the teletypewriter cord circuit is described below.

*Attendant's teletypewriter cord circuit connected to Hub jack*

Let us assume that cord 301, Fig. 4, is connected to Hub jack 150 of Fig. 1. The sleeve circuit may be traced from battery 142 through resistance 143 to the sleeve of hub jack 150 in Fig. 1 and then over the sleeve of the cord 301 through relays S, B and A to battery 327 in Fig. 4. Batteries 142, Fig. 1, and 327, Fig. 4, are poled in opposition and the voltage of battery 142 is approximately twice that of battery 327.

The current flow through the windings of relays A, B and S in Fig. 4 is in such a direction as to actuate the armature of polar relay A to engage with its left-hand contact 384. The contact 386 of polar relay S remains open as the current is not in the proper direction to close it. The current is not sufficient to operate marginal relay B, Fig. 4. Relay A when operated connects ground to the winding of relay A1 causing its operation. Relay A1 connects ground through contact 368 to start the teletypewriter motor. As relay B1 is released at this time, relay A2 will also operate on current which flows from ground through contact 388 of relay A1 through contacts 391 of unoperated relay B1 and the winding of relay A2 to battery 331. Signals received from the sending hub in Fig. 1 enter the cord circuit per Fig. 4 over the tip conductor and pass through resistance 320 to the grid of tube 317. The grid of tube 317 is brought to a positive potential for a mark and to a negative potential for a space. For the marking or positive condition the tube conducts and current flows from ground on the cathode to the plate of tube 317, through the upper windings of relays R and R1, and through resistance 313 to battery 307. This current which is approximately twice the value of the spacing current flowing in the lower windings of relays R and R1 causes the relays to operate to marking. Relay R1 operates the teletypewriter receiving magnet 339 on a neutral basis, closing and opening a circuit from battery 309 through resistance 308, its own armature and the winding of magnet 339 for the marking and spacing condition, respectively. Relay R transmits on a polar basis from batteries 310 and 311 through resistance 312 to the tip of transmission measuring set jack TMS, through the input relay of the transmission measuring set, to ground on the ring of jack TMS. The screen grid of tube 317 is connected to the potentiometer formed by battery 316 connected through resistances 315 and 314 to ground. This potentiometer is adjusted to produce the desired plate current through the upper windings of relays R and R1 for the marking condition.

The position teletypewriter sends signals into the sending hub. Local copy is obtained from the sending circuit which connects to the tip of the cord circuit and outgoing signals are therefore received by the position teletypewriter through the receiving element as previously explained. In order to send to the sending hub it is necessary to operate the teletypewriter send key Send TTY. This removes a ground from the upper winding of polar send relay E which in the idle condition holds the armature of this relay in engagement with its right-hand or marking contact. It also closes the sending circuit which extends from batteries 305 and 306 through the armature of relay E, resistance 303, closed left-hand contacts of key Send TTY, contacts 365 of relay B1, which relay is released, operated contacts 393 of relay A2, resistance 330, through the plate circuit of tube 332 and through operated contact 359 of relay A1 to the tip of the teletypewriter cord 301. When the armature of sending relay E is connected to marking positive battery 305, the tube is non-conducting since the cathode potential which is the same as that of battery 305 is higher than its plate which is +40-volt hub potential. Tube 332 therefore acts like a diode and completely isolates the armature of relay E from the hub circuit during transmission of a mark. For a space, the armature of relay E connects negative battery 306 through resistances 303 and 330 to the cathode of tube 332. In this case the tube conducts since its cathode is negative with respect to its plate. In the conducting or spacing condition current flows from the sending hub through the plate circuit of tube 332, resistances 330 and 303 to negative battery 306 and this causes the potential of the hub to become negative due to the voltage drop across the hub potentiometer network. A negative voltage on the sending hub constitutes a spacing condition on the hub.

It should be noted that battery 334 connects to the cathode of tube 332 via resistance 333. The purpose of this negative battery and resistance branch is to prevent the cathode from becoming too positive in potential with respect to the tube heater element when the tube is in the marking or non-conducting condition.

*Teletypewriter cord circuit connected to Leg jack of concentration jack circuit*

When the teletypewriter cord circuit per Fig. 4 is connected to the Leg jack of a concentration jack circuit per Fig. 1, current flows from battery 327 in Fig. 4 through the windings of relays A, B and S and over the sleeves of the cord and the Legs jack to ground through resistance 138, Fig. 1. This results in actuating the armature of relay S to engage its contact 386 which connects ground to start the teletypewriter motor. The armature of relay A remains in engagement with its right-hand contact 382 as shown and relay B does not operate because the current flow is in the wrong direction to operate polar relay A and it is not of sufficient value to operate marginal relay B. Signals from the facility to which the teletypewriter cord circuit is connected will be received on the RL lead which terminates on the tip of jack Legs in Fig. 1. These signals pass over the tip of the cord to the grid of tube 317 via resistance 320. The ring of the cord connects to the sending leg of the facility per Fig. 1 which has a positive potential applied through the line winding of the S relay in Fig. 1. The ring of the cord extends through back contact 360 of relay A1 in Fig. 4, through resistance 337, back contact 361 of relay A1, closed contacts 362 of full duplex-half duplex key FDX—HDX, and resistance 319 to the grid of tube 317. In view of the fact that a steady positive potential is connected to the grid of tube 317 through the ring of the cord circuit, the grid potential requires the addition of a compensatory negative potential, in order to restore the symmetry of the receiving element and permit the equal and opposite potentials received over the tip conductor from the facility to produce unbiased reception. This is accomplished by the branch circuit consisting of negative battery 336 which connects to the grid through back contacts 364 of relay A1 and resistance 318. Tube 317 conducts for a marking signal and is non-conducting for a space and the remainder of the receiving element performs in the same manner as was previously described for the condition when the cord is connected to a Hub jack.

Transmission toward the facility requires the operation of the teletypewriter sending key Send TTY which permits the sending contacts 302 of the teletypewriter to operate sending relay E. The signals transmitted pass from the armature of sending relay E through resistance 303, closed contacts 377 of key Send TTY, back contacts 365 of relay B1, contacts 380 of relay A2, closed contacts of ringing key Ring, resistance 337, back contacts 360 of relay A1, to the ring of the teletypewriter cord 301, ring of the legs jack of the connected facility and then over the sending leg SL which includes resistance 135 to operate the S relay in the facility in Fig. 1. The sending relay in Fig. 1 is operated on an inverse neutral basis as previously explained.

It should be noted that the signals transmitted by sending relay E, in addition to passing through resistance 337 on the way to the ring of the cord, also pass through the adjacent back contacts 361 of relay A1, closed contacts 362 of key FDX—HDX, and resistance 319 to the grid of tube 317. Thus outgoing signals are transmitted into the receiving element and produce local copy.

Local copy is obtained provided transmission over the facility is on a half duplex basis. The cord circuit provides for full duplex as well as half duplex communication over the facility, however, in order that the full duplex transmission capabilities of the facility may be easily checked. Full duplex operation is obtained by operating key FDX—HDX which opens the local copy circuit to prevent the outgoing signals from reaching the grid of tube 317. It also causes the release of relay F which previous to the operation of the key has been held operated from ground on back contacts 387 of relay A1. Release of relay F connects resistance 319 in parallel with resistance 320 and this provides a lower impedance between the tip of the cord and the grid of tube 317. This lower impedance to signals received from the facility helps to raise the positive marking grid potential of tube 317 so as to compensate for the reduction in the positive value of this potential that is brought about by disconnecting the ring conductor of the cord which is at a positive potential, when idle, from the branch that includes resistance 319.

*Teletypewriter cord circuit connected to Test jack of concentration jack circuit*

The teletypewriter cord circuit per Fig. 4 is connected to the Test jack of a concentration jack circuit for monitoring signals from the associated facility or from the concentration group. It also provides for communicating with the concentration group when the facility is split off from the group. Sleeve current flows from battery 327 through the windings of relays A, B and S, over the sleeves of the cord circuit and the Test jack circuit and through the winding of relay T in Fig. 1 to negative battery 139. Batteries 139 and 327 are poled opposing but since the voltage of battery 139 is about five times as high as that of battery 327, current flows in a direction to operate the armature of polar relay A to the left to engage contact 384 but the armature of polar relay S remains in its right-hand position in engagement with contact 385. Owing to the high voltage of battery 139 in Fig. 1 the sleeve current is now sufficiently high to operate marginal relay B in Fig. 4. Relays A and B when thus operated cause relays A1 and B1 to operate over obvious circuits and relay A1 connects ground through contact 368 to start the teletypewriter motor. Relay A2 is unoperated at this time because its operating circuit is opened by the operation of relay B1. With keys Split and Send TTY unoperated, the cord circuit is arranged for monitoring. When key FDX—HDX is in the normal condition, as shown, the cord per Fig. 4 will monitor signals from the facility and from the concentration group and when this key is operated it will monitor signals from the facility only. When key FDX—HDX is in the normal condition, as shown, signals are received from the facility over the tip of the cord and pass through resistance 320 to the grid of tube 317. Since transmission can be only half duplex, into a concentration group, when signals are being received from the facility the SL lead of the facility is at a steady positive potential which is the marking condition. The SL lead is connected to the ring of the cord circuit and extends through operated contacts 374 of relay B1, contacts 362 of full-duplex, half-duplex key, FDX—HDX, and resistance 319 to the grid of tube 317. Battery 336 is now connected through operated contacts 370 of relay B1 and resistance 318 to the grid of tube 317 and this compensates for the presence of the steady positive potential from the SL lead on the grid. Tube 317 and the receiving element therefore respond in an unbiased manner to transmission from the RL lead of the facility. When the facility ceases to transmit signals, it sends a steady mark, positive potential, over the tip of the cord and the concentration group may send toward the facility. Tube 317 and the receiving element will respond to signals from the concentration group which enter the cord circuit over the ring conductor.

When key FDX—HDX is operated to its open position, the connection between the ring of the cord circuit and the receiving element is opened at contact 362 so that the receiving element can no longer respond to signals from the concentration group. Opening of key FDX—HDX also causes relay F to release and connects resistance 319 in parallel with resistance 320. This serves to reduce the impedance between the RL lead of the facility and the grid of tube 317 and permits the receiving element to respond in an unbiased manner to signals from the facility when the positive potential formerly applied to the grid of tube 317 through resistance 319 is no longer present.

Key Split of the cord circuit is operated to its closed position to split the facility off from the concentration group. This operates split relay SP from ground through contacts 371, 372 and 373 through the winding of relay SP to battery. Relay SP when operated, short-circuits the windings of sleeve relays A, B and S by closing contact 374 and thereby increases the sleeve current sufficiently to cause the operation of relay T in the sleeve of the Test jack circuit, Fig. 1. Relays A1 and B1 which were initially operated from relays A and B when the cord was connected to the Test jack will remain locked up from ground through contacts 371 of relay B1, contacts 372 of operated key Split and through contacts 375 and 376 in parallel to battery through the windings of relays A1 and B1. When relay T, Fig. 1, is operated the RL and SL legs are opened to disconnect the facility from the control circuit and the SL leg lead from the control circuit is connected through contact 161 to the ring of the Test jack. The RL leg lead of the control circuit remains connected to the tip of the Test jack. The cord circuit is not arranged for monitoring from the concentration group with key Split operated. When the Split key is operated it is possible to communicate with the concentration group provided key Send TTY is first operated and key FDX—HDX is released. With this arrangement signals from the concentration group will pass through the control circuit, over lead SL, through contacts 161 of relay T, Fig. 1, to the ring of jack Test and over the ring of the cord circuit, through operated contacts 374 of relay B1, closed contacts 362 of key FDX—HDX and through resistance 319 to the grid of tube 317. Tube V4 of the control circuit of Fig. 1 is non-conducting for the marking condition but positive battery 156 furnishes the necessary positive potential through resistance 155 to send a marking pulse into the teletypewriter cord circuit. For the spacing condition tube V4 conducts and reduces the positive potential furnished by battery 156 by a sufficient amount to make tube 317, Fig 4, non-conducting. As communication is on a half duplex basis, a steady positive, marking, potential will be impressed on the tip conductor of the cord circuit by sending relay E while signals are being received from the concentration group This steady marking voltage will be applied to the grid of tube 317 through resistance 320. As negative battery 336 is connected to the grid of tube 317 through operated contacts 370 of relay B1 and resistance 318 the marking and spacing grid voltages will be approximately correct for unbiased reception of signals from the concentration group as previously explained When signals cease to be received from the concentration group, a steady marking, positive, potential will be impressed on the ring of the cord from positive battery 156 in the control circuit Signals transmitted toward the control circuit will be sent from relay E, Fig 4, and these will pass through resistance 303, operated contacts 377 of key Send TTY, operated contacts 378 of relay SP, which is operated from key Split, through back contacts 380 of relay A2 and the operated contacts 359 of relay A1 to the tip of the cord circuit. From the tip of the cord circuit the outgoing signals will pass over the RL leg lead Fig. 1 to the control circuit. The voltages received by the control circuit will be positive for mark and negative for space which will result in normal transmission through the control circuit toward the concentration group. Local copy will be received by the receiving element of the cord circuit as the outgoing signals will be applied to the grid of tube 317 through resistance 320. With steady positive potential applied to the grid through resistance 319 as previously mentioned and negative battery 335 connected to the grid via operated contacts 370 of relay B1 and resistance 318, the receiving element will respond to local signals on the tip of the cord circuit with reasonable fidelity.

It will be noted that relay SQ is operated by the operation of key Split over a circuit from ground on relay A through contacts 382 and 383 and through the winding of relay SQ to battery. Operation of relay SQ performs no useful function at this time.

*Teletypewriter cord circuit connected to teletypewriter jack of test signal cord circuit*

When the teletypewriter cord circuit per Fig. 4 is connected to the teletypewriter jack TTY of the test signal cord circuit per Fig. 2, current flows from ground on the sleeve of jack TTY through resistance 204, over the sleeve of the teletypewriter cord circuit, through the windings of relays S, B and A to battery 327, Fig. 4. The current value is too low to operate marginal relay B and is in the wrong direction to operate polar relay A to engage contact 384. Polar relay S will be operated to engage contact 386 and the circuit arrangement within the teletypewriter cord circuit will be similar to that which exists when the teletypewriter cord circuit is connected to the Legs jack of a concentration jack circuit, as previously explained.

The cord circuit may monitor test signals that are being transmitted through the test signal cord circuit. These signals enter the teletypewriter cord circuit over the ring circuit, pass through back contacts 360 of relay A1 which is released, through resistance 337 and back contacts 361 of relay A1, closed contacts 362 of key FDX—HDX and through resistance 319 to the grid of tube 317. Negative battery 336 also is connected to this grid through back contacts 364 of relay A1 and resistance 318, and since a steady positive potential is connected to the grid from the RL lead of the facility via the tip of the cord circuit and resistance 320, the tube will respond to the outgoing test signals.

Full duplex transmission tests may be conducted over the facility. This is accomplished by sending test signals over the test signal cord circuit in the usual manner while the distant attendant sends test signals simultaneously using his test signal cord circuit. Each attendant connects his teletypewriter cord circuit to the teletypewriter jack of his test signal cord circuit and connects his transmission measuring set to the TMS jack of his teletypewriter cord circuit. The FDX—HDX key of each teletypewriter cord circuit is operated so that the receiving element will respond only to the incoming signals which pass from the RL lead of the facility over the tip of the teletypewriter cord circuit and through resistances 319 and 320 which are now in parallel owing to the release of relay F, to the grid of tube 317. Tube 317 responds to the signals and the receiving relay R repeats them to the transmission measuring set which measures the bias and distortion of the incoming signals.

After transmission of test signals has been stopped, the local attendant may communicate with the distant attendant on a half duplex basis. To do this it is necessary to connect the teletypewriter cord circuit to the teletypewriter jack of the test signal cord circuit and operate keys Send TTY and Split. Operation of key Split causes relay SQ to operate from ground through contact 382 of relay A, contact 383 of the key Split and through the winding of relay SQ to battery. Signals from the distant attendant are received from the RL lead of the facility and pass over the tip of the test signal cord circuit, and tip of the TTY cord circuit and through resistance 320 to the grid of tube 317. As this communication is half-duplex, sending relay E is transmitting a mark while signals are incoming from the distant attendant. Thus at this time positive battery 395, Fig. 4, is connected through the marking contact and armature of relay E, through resistance 393, operated contacts 377 of key Send TTY, back contacts 365 of relay B1, back contacts 380 of relay A2, operated contacts of relay SQ and back contacts 360 of relay A1 to the ring of the cord circuit. The positive potential thus applied to the ring of the cord circuit also is applied to the grid of tube 317 via resistance 337, back contacts 361 of relay A1, closed contacts 362 of key FDX—HDX and resistance 319 to the grid and since negative battery 336 is also connected to the grid of tube 317 through back contacts 364 of relay A1 and resistance 318 the tube and receiving element will respond to signals from the distant attendant.

Signals are transmitted outward over the path previously described for the outgoing marking, positive, signal and they pass from the ring of the teletypewriter cord circuit per Fig. 4 over the ring of the test signal cord circuit of Fig. 2, and through resistance 201, Fig. 2, to the sending relay of the facility. Owing to the presence of resistance 201, Fig. 2, in the outgoing circuit it is necessary that resistance 337, Fig. 4, which is identical in value to resistance 201, Fig. 2, be short circuited so as to avoid excessive reduction in current value. This is accomplished by the provision of relay SQ which as previously noted is operated by means of the Split key.

Local copy is provided when communicating with the distant attendant through the test signal cord circuit. Steady positive, marking, potential is received from the facility, through the tip of the test signal cord circuit and over the tip of the teletypewriter cord via resistance 320 to the grid of tube 317. The outgoing signals which pass over the ring of the cord also reach the grid of the tube through resistance 337, back contacts 361 of relay A1, closed contacts 362 of key FDX—HDX and resistance 319. Since negative battery 336 is connected to the grid in the manner previously mentioned, the tube and receiving element will provide local copy.

*Manual telegraph cord circuit*

The manual telegraph cord circuit is shown in Fig. 5. Its purpose is to connect a telegraph set consisting of a key and sounder to any of the various circuits in the service board for monitoring and communication. It is identical in design and operation to the attendants TTY cord circuit except for the following differences:

1. Relay S Fig. 4 is replaced by resistance 349 in Fig. 5.

2. The teletypewriter magnet 339 in Fig. 4 is replaced by the Morse sounder 439 in Fig. 5.

3. The teletypewriter sending contacts 302 in Fig. 4 are replaced by the Morse key 402, Fig. 5.

4. There is no teletypewriter motor and no teletypewriter motor starting arrangement is therefore required.

5. A second cord CIS 443 is provided in Fig. 5. This cord is used to answer and communicate with Morse stations that have called in for assistance.

*Calling in signal cord per Fig. 5 and calling in signal circuit per Fig. 5A*

Operation of cord CIS 443 will now be described:

Fig. 5A shows a Morse loop and loop repeater with a customer's calling-in circuit. Cord CIS, 443, is connected to the customer answer jack, CUST ANS, Fig. 5A, to answer a call for assistance from the Morse station. When the customer connected to Fig. 5A calls-in, relay CS operates and applies ground through back contacts of relay SL to operate relay ML. Relay ML, when operated, applies battery to the ANS lamp circuit to light the lamp. It also connects ground through back contacts of relay SL to hold itself operated through released relay SL after the ground has been removed from the armature of relay SL by the release of relay CS. The local attendant connects cord CIS, Fig. 5, to the CUST ANS jack of Fig. 5A and current flows from positive battery 351 through the winding of relay SL and resistance 346 to the sleeve and over the sleeve lead in the CIS cord circuit, through varistor 342 and relay S1 to ground. Varistor 342 is provided to prevent relay S1 from operating if the CIS cord is connected to a Test or Hub jack inadvertently. Relays S1, Fig. 5, and SL Fig. 5A both operate. Relay SL, Fig. 5A, in operating causes relay ML to release and put out the ANS lamp. Relay S1 arranges the circuit so that sending relay E, Fig. 5, can send signals through the line winding of relay R2 to the tip of the CIS cord. To do this, key Send TLG is operated and the signals pass from the sending contacts of relay E through resistance 303, left-hand operated contacts of key Send TLG, operated contacts 443 of relay S1, line winding of relay R2, over the tip conductor of cord CIS, over tip conductor of CUST ANS jack circuit, Fig. 5A, through the rings of jacks EQ and LP, lower winding of relay CS, resistance 347, through the Morse station set, potentiometer 348, upper winding of relay CS, tip conductors of jacks LP and EQ to negative battery in the loop repeater. Transmission is on a neutral basis and the outgoing signals are transmitted to the hub through the loop repeater and control circuit in addition to being received at the Morse station. Local copy is obtained from polar relay R2 which follows the outgoing signals. The lower winding of this relay serves as a biasing winding and current flow from battery 345 through the winding to ground tends to operate the relay to spacing. Relay R2 sends neutral signals from battery 344 through the marking contact and armature of relay R2 and operated contacts 449 of relay S1 to Morse sounder 439 for local copy.

When the customer's station in Fig. 5A sends to the service board attendant, the loop is opened and closed which interrupts the loop current which flows from positive battery 305, Fig. 5, through the sending circuit of Fig. 5 and over the loop to negative battery in the loop repeater. These signals actuate the receiving relay, not shown, in the loop repeater which repeats them via the control circuit into the concentration group. Relay R2 of Fig. 5 also responds to the signals from the station and repeats them on a neutral basis through operated contacts 449 of relay S1 and the winding of telegraph sounder 439 to ground thereby actuating the sounder.

*Loop monitoring circuit Fig. 6*

The loop monitoring circuit is shown in Fig. 6. It is used for monitoring signals in subscriber loops, and also provides means for sending and receiving test signals through a loop repeater from the loop side as a means of testing the repeater and control circuit between the hub and the loop.

The method of monitoring in a loop will now be described. The loop monitoring circuit extends from the service board to the line position of the telegraph test board. Jacks Send FOX, MON Polar, MON Neutral and Disc appear in the face of the service board and Jacks RGL and RGEQ, key RLS and lamp DISC appear in the line position. When the attendant at the service board wishes to monitor, he requests the line position attendant to patch jacks RGL and RGEQ, to the LP and EQ jacks of the loop on which he wishes to monitor. The LP and EQ jack circuit of a loop repeater is shown in Fig. 6A. The line board attendant uses two loop patching cord circuits similar to that shown in Fig. 6B, to make the patch. He patches the LP cord of the first cord circuit to the RGL jack of the loop monitoring circuit and the EQ cord to the EQ jack of the loop and equipment jack circuit. Next he patches the LP cord of the second cord circuit to the LP jack of the loop and equipment jack circuit and the EQ cord to the RGEQ jack of the loop monitoring circuit. Fig. 5A shows a loop repeater with its LP and EQ jack circuit, calling-in relay and loop. The service board attendant connects his teletypewriter cord circuit to the MON Polar jack if loop transmission is polar from the loop repeater to station, i. e. if the loop returns to ground instead of to the positive battery shown in the loop repeater of Fig. 5A. For neutral transmission such as that shown in Fig. 5A where the loop returns to positive battery in the loop repeater, the attendant connects his teletypewriter cord circuit to the MON Neutral jack. In either case the loop circuit will be closed through the line winding of relay R and the back contacts of relay FS, Fig. 6. If transmission is polar it is only polar when transmission is from the loop repeater to the station and it is always neutral when transmission is from the station to the loop repeater. Connection of the TTY cord circuit to the MON Polar jack causes the bias circuit of relay R to be left open and the teletypewriter cord cannot monitor signals from the station to the loop repeater unless it is disconnected from the MON Polar and connected to the MON Neutral jack. Connection of the TTY cord circuit to the MON Neutral jack causes sleeve relay S to operate and close the bias circuit of the R relay. Relay R will now respond to neutral signals in the loop. In any case relay R will repeat the signals through resistance 405 to the tip and ring conductors of jacks MON Polar and MON Neutral. When the teletypewriter cord circuit is connected to any jack of the loop monitoring circuit jacks at the service board, negative battery of high potential on the sleeve of the jack causes sleeve relays A and B of the cord circuit per Fig. 4 to operate. The cord circuit is therefore arranged in the same manner as when it is connected to the Test jack of a concentration jack circuit. Signals from the loop monitoring circuit pass over the tip and ring conductors of the cord circuit of Fig. 4. From the tip the signals pass through resistance 320 to the grid of tube 317. From the ring the signals pass through operated contacts of relay B1 and closed contacts of key FDX—HDX, resistance 319 to the grid of tube 317, and resistances 319 and 320 are effectively in parallel. The receiving element of the cord circuit therefore responds to the signals in a satisfactory manner.

When it is desirable to send test signals through a loop repeater and control circuit and make transmission measurements on the hub, the RGL jack of the loop monitoring circuit Fig. 6 is patched to the EQ jack per Fig. 5A of the loop repeater under test using a loop patching cord circuit per Fig. 6B. The SIGS jack of a test signal supply circuit per Fig. 3 is patched to the Send FOX jack of the loop monitoring circuit by means of a leg patching cord circuit per Fig. 1B. Sleeve current flows from battery 403 through the winding of relay FS over the sleeve circuit of jack Send FOX, Fig. 6, the leg patching cord circuit and the test signal supply circuit, Fig. 3, through the winding of relays A, B and S to battery 221 in Fig. 3. Relay FS of the loop monitoring circuit operates and closes the circuit between the tips of jacks RGL and Send FOX which includes resistance 404. Relays A and B of the test signal supply circuit per Fig. 3 operate and cause relays A1 and AB to operate. Relays A1 and AB start the multiple sender or other source of test signals and the signals pass through resistance 222, Fig. 3, operated contacts of relays A1 and AB, tip of jack SIGS, tip of the leg patching cord circuit, tip of jack Send FOX of the loop monitoring circuit per Fig. 6, resistance 404, and operated contacts of relay FS to the tip of the jack RGL. From the tip of jack RGL of Fig. 6 the signals pass over the tip of the loop patching cord circuit, Fig. 6B, to the tip of jack EQ, Fig. 6A, and into the loop repeater which repeats the signals via the control circuit to the receiving hub.

Test signals may be sent through the control circuit and loop repeater from the sending hub to the loop side and transmission measurements may be made on the loop side by means of the loop monitoring circuit. In this case the loop monitoring circuit is patched to the LP and EQ jacks of the loop repeater under test in the same manner as previously described for the monitoring condition. This patch requires two loop patching cord circuits per Fig. 6B. The patch between the test signal supply circuit and the Send FOX jack is removed to permit the FS relay to be released and thereby close the loop for monitoring.

What is claimed is:

1. In combination in a telegraph system, a telegraph concentration group circuit comprising a plurality of telegraph lines each interconnected through an individual telegraph line repeater, an individual jack circuit and a telegraph hub line repeater electronic control circuit, for regulating the direction of transmission, said interconnection by means of an individual receiving leg and an individual sending leg to a single receiving hub and a single sending hub common to all of said telegraph lines, and means comprising an attendant's cord circuit having a telegraph transmitter and receiver therein for communicating either over an individual one of said plurality of lines or through the hub of said concentration to all of said lines.

2. In combination in a telegraph system, a telegraph concentration group circuit comprising a plurality of telegraph lines each interconnected through an individual telegraph line repeater, an individual jack circuit and a telegraph hub line repeater electronic control circuit, for regulating the direction of transmission, said interconnection by means of an individual receiving leg and an individual sending leg to a single receiving hub and a single sending hub common to all of said telegraph lines, a spare telegraph line equipped with an individual telegraph line repeater and an individual jack circuit, a spare telegraph hub line repeater electronic control circuit, and means including a patching cord circuit for interconnecting said spare line through said spare control circuit to said receiving hub and said sending hub.

3. In combination in a telegraph system, a telegraph concentration group circuit comprising a plurality of telegraph lines each interconnected through an individual telegraph line repeater, an individual jack circuit and a telegraph hub line repeater electronic control circuit, for regulating the direction of transmission, said interconnection by means of an individual receiving leg and an individual sending leg, to a single receiving hub and a single sending hub common to all of said telegraph lines, a spare telegraph line equipped with an individual telegraph line repeater and an individual jack circuit, means comprising a patching cord and said jack circuits for interconnecting said spare line through any selected one of said electronic control circuits to said receiving hub and said sending hub and releasing means responsive to the interconnection of said spare line for disconnecting the line regularly interconnected through said selected control circuit to said hubs.

4. In combination in a telegraph system, a telegraph concentration group circuit comprising a plurality of telegraph lines and loops each interconnected through an individual telegraph line repeater, an individual jack circuit and a telegraph hub line repeater electronic control circuit, for regulating the direction of transmission, said interconnection by means of an individual receiving leg and an individual sending leg to a single receiving hub and a single sending hub common to all of said telegraph lines and loops, a hub jack connected to said hubs, a source of test signals and a test signal cord circuit for interconnecting said test signal source through any of said individual jack circuits to its associated line or loop and another cord circuit for connecting said source to said concentration group circuit through said hub jack.

5. In combination in a telegraph system, a telegraph concentration group circuit comprising a plurality of telegraph lines each interconnected through an individual telegraph line repeater, an individual jack circuit and a telegraph hub line repeater electronic control circuit, for regulating the direction of transmission, said interconnection by means of an individual receiving leg and an individual sending leg to a single receiving hub and a single sending hub common to all of said telegraph lines, a test signal cord circuit connectable to any desired one of said jack circuits, a test signal supply circuit connectable to said cord circuit so as to furnish test signals through said test signal cord circuit and said one jack circuit, an attendant's communication cord circuit and means for connecting said communication cord circuit through said test signal cord circuit and said one jack circuit to its associated telegraph line.

6. In combination in a telegraph system, a telegraph concentration group circuit comprising a plurality of telegraph lines each interconnected through an individual telegraph line repeater, an individual jack circuit and a telegraph hub repeater electronic control circuit, for regulating the direction of transmission, said interconnection by means of an individual receiving leg and an individual sending leg to a single receiving hub and a single sending hub common to all of said lines, a telegraph communication cord circuit connectable to said concentration group circuit, and electronic means in said cord circuit responsive to potentials impressed thereon by said concentration group circuit for receiving telegraph signals in said cord circuit.

7. In combination in a telegraph system, a telegraph concentration group circuit comprising a plurality of telegraph lines each interconnected through an individual telegraph line repeater, an individual jack circuit and a telegraph hub repeater electronic control circuit, for regulating the direction of transmission, said interconnection by means of an individual receiving leg and an individual sending leg to a single receiving hub and a single sending hub common to all of said lines, an attendant's teletypewriter cord circuit connectable to any desired one of said jack circuits for communication either over its associated individual line or through said hub circuit, a telegraph receiver in said cord circuit, an electronic device in said cord circuit for controlling said receiver, a network of resistances connected to said device for controlling said device, and selectively actuable switching means in said cord circuit for changing the components of said network for different communication conditions.

8. In combination in a telegraph circuit, an electronic hub concentration group circuit, a Morse loop circuit separate from said concentration, an attendant's communication cord circuit including electronic telegraph receiving means connectable to said group circuit at a first time and to said loop circuit at a second time, and selectively actuable means in said cord circuit responsive to the connection of said cord to said group circuit or said loop circuit for conditioning said cord for communication with said group or said loop.

MATTHEW R. PURVIS.

REFERENCES CITED

The following references are of record in the file of this patent:

UNITED STATES PATENTS

| Number | Name | Date |
|---|---|---|
| 2,337,886 | Hanley | Dec. 28, 1943 |
| 2,349,586 | Bonorden et al. | May 23, 1944 |
| 2,352,272 | Large et al. | June 27, 1944 |
| 2,387,558 | Bonorden | Oct. 23, 1945 |
| 2,464,371 | Blyholder | Mar. 14, 1949 |